United States Patent
Chang

(10) Patent No.: US 9,743,475 B1
(45) Date of Patent: Aug. 22, 2017

(54) OPERATION METHOD FOR LED DIMMING DEVICE

(71) Applicant: ANPEC ELECTRONICS CORPORATION, Hsinchu (TW)

(72) Inventor: Che-Chang Chang, Hsinchu (TW)

(73) Assignee: ANPEC ELECTRONICS CORPORATION, Hsinchu (TW)

(*) Notice: Subject to any disclaimer, the term of this patent is extended or adjusted under 35 U.S.C. 154(b) by 0 days.

(21) Appl. No.: 15/158,940

(22) Filed: May 19, 2016

(30) Foreign Application Priority Data

Mar. 25, 2016 (TW) .............................. 105109446 A

(51) Int. Cl.
H05B 33/08 (2006.01)

(52) U.S. Cl.
CPC ..... H05B 33/0845 (2013.01); H05B 33/0815 (2013.01)

(58) Field of Classification Search
CPC .... H05B 37/02; H05B 33/08; H05B 33/0815; H05B 33/0845
See application file for complete search history.

(56) References Cited

U.S. PATENT DOCUMENTS

| 7,836,828 | B2* | 11/2010 | Martikainen | ............. | F42B 7/04 |
| | | | | | 102/458 |
| 8,339,067 | B2* | 12/2012 | Lin | .................... | H05B 33/0818 |
| | | | | | 315/291 |
| 2015/0023801 | A1* | 1/2015 | Tsai | ........................ | H02P 23/22 |
| | | | | | 417/42 |

FOREIGN PATENT DOCUMENTS

| CN | 102281665 A | 12/2011 |
| TW | 201043091 A1 | 12/2010 |
| TW | 201143509 A1 | 12/2011 |
| TW | 201206246 A1 | 2/2012 |

* cited by examiner

*Primary Examiner* — Thai Pham
(74) *Attorney, Agent, or Firm* — Li & Cai Intellectual Property (USA) Office

(57) ABSTRACT

Disclosed is an operation method for LED dimming device. The operation method includes the following steps. Step A: sampling a pulse width modulation signal, and respectively counting for a time period when the pulse width modulation signal is at high level and a time period when the pulse width modulation signal is at low level. Step B: determining whether a rising edge of the pulse width modulation signal is detected. Step C: calculating a duty cycle of the pulse width modulation signal when the rising edge is detected. Step D: resetting a counter module. Step E: driving a LED module according to the duty cycle.

6 Claims, 3 Drawing Sheets

OPERATION METHOD FOR LED DIMMING DEVICE

BACKGROUND OF THE INVENTION

1. Field of the Invention

The instant disclosure relates to an operation method for an LED dimming device; in particular, to an operation method for an LED dimming device that can make the LED flicker-free.

2. Description of Related Art

The light emitting diode has become a common light emitting element used in a lot of electronic devices. Usually, the electronic device having the LEDs has a driving device to receive a pulse width modulation (PWM) signal and to drive the LEDs according to the duty cycle of the pulse width modulation signal.

However, the traditional electronic devices, such as mobile phones, fluorescent lamps or other devices using the LEDs may not tolerate the luminance variation of the LEDs. Thus, an improved design for a dimming circuit is needed to adjust the luminance of the LEDs according to a variation of the duty cycle of the pulse width modulation signal.

SUMMARY OF THE INVENTION

The instant disclosure provides an operation method for an LED dimming device. The operation method comprises: step A: sampling a pulse width modulation signal, and respectively counting a time period when the pulse width modulation signal is at high level and a time period when the pulse width modulation signal is at low level, wherein a first counter of a counter module increases a first counting value when the pulse width modulation signal is at high level and a second counter of the counter module increases a second counting value when the pulse width modulation signal is at low level; step B: determining whether a rising edge of the pulse width modulation signal is detected; step C: calculating a duty cycle of the pulse width modulation signal according to the first counting value and the second counting value stored in the counter module when the rising edge of the pulse width modulation signal is detected; step D: resetting the counter module; and step E: driving an LED module according to the duty cycle.

To sum up, the operation method for an LED dimming device provided by the instant disclosure can dynamically adjust the luminance of an LED according to the variation of the duty cycle of the pulse width modulation signal. Moreover, the operation method for an LED dimming device provided by the instant disclosure can reset the counting values stored in the counter module at a proper timing to prevent the problem that the LED module may flicker because the actual duty cycle differs from the calculated duty cycle.

For further understanding of the instant disclosure, reference is made to the following detailed description illustrating the embodiments of the instant disclosure. The description is only for illustrating the instant disclosure, not for limiting the scope of the claims.

BRIEF DESCRIPTION OF THE DRAWINGS

Embodiments are illustrated by way of example and not by way of limitation in the figures of the accompanying drawings, in which like reference numbers indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It will be understood that, although the terms first, second, third, and the like, may be used herein to describe various elements, but these elements should not be limited by these terms. These terms are only to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

An operation method for an LED dimming device is provided in this embodiment. In this embodiment, the LED dimming device receives a pulse width modulation (PWM) signal, and dynamically adjusts the luminance of an LED module according to the pulse width modulation signal. The frequency of the pulse width modulation signal is variable but not constant.

Figure 4:
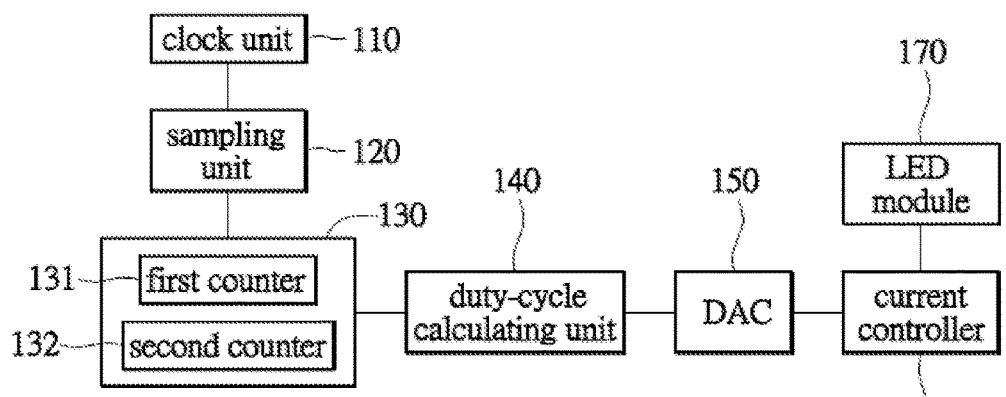
FIG. 4 shows a schematic diagram of an LED dimming device of one embodiment of the instant disclosure.

As shown in FIG. 4, the LED dimming device 100 comprises a sampling unit 120, a clock unit 110, a counter module 130, a duty-cycle calculating unit 140, a digital to analog converter (DAC) 150 and a current controller 160. The sampling unit 120 is connected to the counter module 130. The clock unit 110 is connected to the sampling unit 120 and the counter module 130. The counter module 130 is connected to the duty-cycle calculating unit 140. The duty-cycle calculating unit 140 is connected to the digital to analog converter 150. The digital to analog converter 150 is connected to the current controller 160. The current controller 160 is connected to the LED module 170.

The clock unit 110 comprises proper logics, circuits and/or codes, and is configured to provide a clock signal to the sampling unit 120 and the counter module 130. The clock signal has a constant period.

The sampling unit 120 comprises proper logics, circuits and/or codes, and is configured to receive a pulse width modulation signal, samples the pulse width modulation signal according to the clock signal, and outputs each sampling result to the counter module 130.

The counter module 130 comprises a first counter 131 and a second counter 132. The first counter 131 counts for a time period when the pulse width modulation signal is at high level. To count for the time period when the pulse width modulation signal is at high level, each time when the sampling result indicates that the pulse width modulation signal is at high level, a first counting value stored in the first counter 131 is added by 1. For example, if the first counting value is originally 0, it will be added by 1 and turn out to be 1 (0+1=1). On the other hand, the second counter 132 counts for a time period when the pulse width modulation signal is at low level. To count for the time period when the pulse width modulation signal is at low level, each time when the sampling result indicates that the pulse width modulation signal is at low level, a second counting value stored in the second counter 132 is added by 1. For example, if the second counting value is originally 0, it will be added by 1 and turn out to be 1 (0+1=1). After that, when one period of sampling the pulse width modulation signal ends, the first counter 131 and the second counter 132 respectively output a first counting value and a second counting value to the duty-cycle calculating unit 140.

The duty-cycle calculating unit 140 comprises proper logics, circuits and/or codes, and is configured to calculate a duty cycle of the pulse width modulation signal according to the first counting value and the second counting value. Specifically, the duty-cycle calculating unit 140 calculates and obtains the duty cycle of the pulse width modulation signal by dividing the first counting value by the sum of the first counting value and the second counting value. After that, according to the calculated duty cycle, the duty-cycle calculating unit 140 outputs a control signal to the digital to analog converter 150.

The digital to analog converter 150 comprises proper logics, circuits and/or codes, and is configured to convert the control signal provided by the duty-cycle calculating unit 140 to an analog control signal, and output the analog control signal to the current controller 160.

The current controller 160 comprises proper logics, circuits and/or codes, and is configured to provide a current to the LED module 170 according to the analog control signal to drive the LED module 170.

The LED module 170 comprises at least one LED that is controlled by the LED dimming device 100. The LED module 170 emits light according to a current output by the current controller. The labels of the LED dimming device 100, the sampling unit 120, the clock unit 110, the counter module 130, the first counter 131, the second counter 132, the duty-cycle calculating unit 140, the digital to analog converter 150, the current controller 160, and the LED module 170 described in the exemplary embodiment of FIG. 4 will be omitted in the following paragraph for the sake of brevity.

Figure 1:
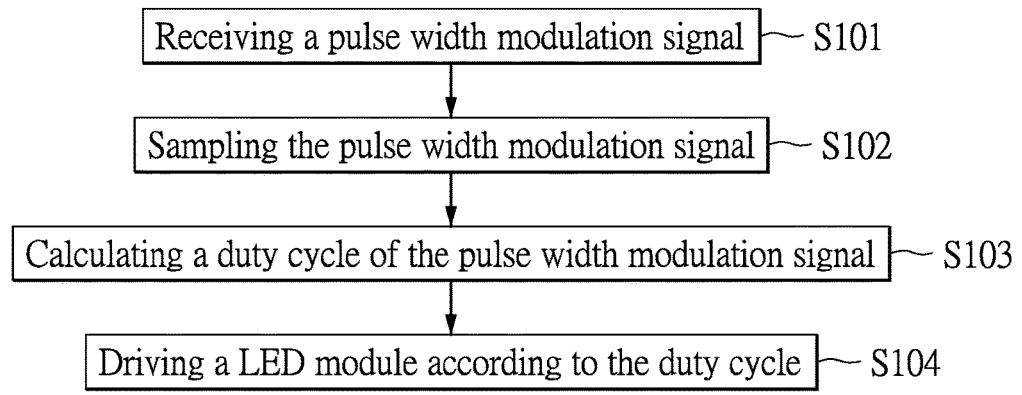
FIG. 1 shows a flow chart of an operation method for an LED dimming device of one embodiment of the instant disclosure.

In order to illustrate the operation of the LED dimming device, refer to FIG. 1. FIG. 1 shows a flow chart of an operation method for an LED dimming device of one embodiment of the instant disclosure. The operation method shown in FIG. 1 can be used in the above mentioned LED dimming device. In step S101, the sampling unit receives a pulse width modulation signal. In step S102, the sampling unit samples the pulse width modulation signal according to the clock signal provided by the clock unit. The frequency of the clock signal is constant, such as 4 MHz. The higher the frequency of the clock signal is, the higher the frequency for the sampling unit to sample the pulse width modulation signal will be.

In step S103, the duty-cycle calculating unit calculates a duty cycle of the pulse width modulation signal. Specifically, a first counter and a second counter of a counter module respectively count for a time period when the pulse width modulation signal is at high level and for a time period when the pulse width modulation signal is at low level, according to sampling results generated after the sampling unit samples the pulse width modulation signal. The duty-cycle calculating unit receives a first counting value and a second counting value provided by the counter module, and calculates and obtains the duty cycle of the pulse width modulation signal by dividing the first counting value by the sum of the first counting value and the second counting value. After that, the duty-cycle calculating unit outputs a control signal according to the calculated duty cycle.

In step S104, the digital to analog converter receives the control signal, and converts the control signal to an analog control signal. Finally, the current controller receives the analog control signal, and drives the LED module according to the analog control signal.

Thereby, the LED dimming device can adjust the luminance of the LED module according to a variation of the duty cycle of the pulse width modulation signal. It is worth mentioning that, in practice, when the duty cycle of the pulse width modulation signal varies (for example, the duty cycle decreases from 99.9998% to 96.9998%), the sampling unit may not be able to sample the pulse width modulation signal of which the duty cycle is larger than 96.9998%. In other words, the time period when the pulse width modulation signal, of which the duty cycle is 96.9998%, is at low level is shorter than the reciprocal of the sampling frequency of the sampling unit, such that the sampling unit is unable to sample the pulse width modulation signal and thus able to obtain the duty cycle of the pulse width modulation signal. Besides, though the duty cycle of the pulse width modulation signal varies, the first counter still keeps a counting value related to the original duty cycle of the pulse width modulation signal. Thus, if the duty-cycle calculating unit calculates the duty cycle of the pulse width modulation signal according to the counting value related to the original duty cycle of the pulse width modulation signal, there must be an error between the calculated duty cycle of the pulse width modulation signal and the actual duty cycle of the pulse width modulation signal, which results in the flicking of the LED module.

To avoid the flicking of the LED module, the LED dimming device in this embodiment further comprises a rising-edge detecting unit. The rising-edge detecting unit is connected to the sampling unit, the counter module and the duty-cycle calculating unit.

The rising-edge detecting unit comprises proper logics, circuits and/or codes, and is configured to receive sampling results generated after the sampling unit samples the pulse width modulation signal, and to detect a rising edge of the pulse width modulation signal.

Each time when the rising edge of the pulse width modulation signal is detected by the rising-edge detecting unit, the rising-edge detecting unit outputs a read signal to control the duty-cycle calculating unit to read a first counting value and a second counting value stored in the counter module, and then the rising-edge detecting unit calculates the duty cycle of the pulse width modulation signal according to the first counting value and the second counting value. After that, the rising-edge detecting unit outputs a reset signal to the counter module to reset the first counting value and the second counting value stored in the counter module.

Figure 2:
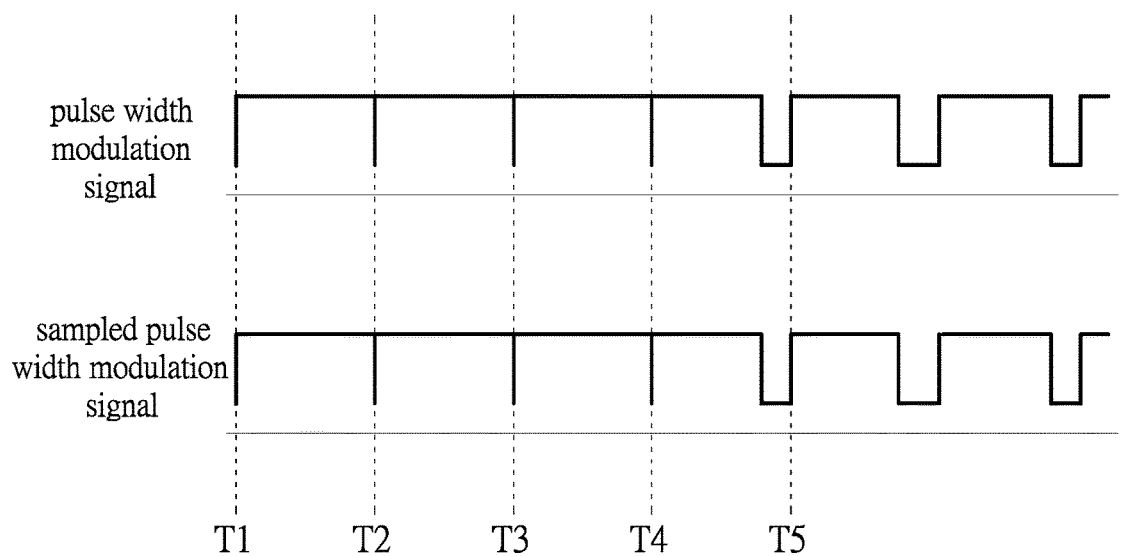
FIG. 2 shows a schematic diagram of detecting a rising edge of a pulse width modulation signal of one embodiment of the instant disclosure.

Refer to FIG. 2. FIG. 2 shows a schematic diagram of detecting a rising edge of a pulse width modulation signal of one embodiment of the instant disclosure. FIG. 2 provides waveform diagrams of the pulse width modulation signal that is originally received by the sampling unit and the pulse width modulation signal that is sampled by the sampling unit. As shown in FIG. 2, at the timing T1, the sampling unit starts to sample the pulse width modulation signal. The original duty cycle of the pulse width modulation signal is, for example, 99.9998%. At the timing T2, a rising edge of the sampled pulse width modulation signal is detected by the rising-edge detecting unit. The duty-cycle calculating unit calculates and obtains a duty cycle of the pulse width modulation signal between the timing T1 and the timing T2 according to a first counting value and a second counting value stored in the counter module. After the duty-cycle calculating unit obtains the duty cycle of the pulse width modulation signal, the rising-edge detecting unit outputs a reset signal to the first counter and the second counter, such that the first counting value and the second counting value are both reset as 0.

Likewise, at timing T3, a rising edge of the sampled pulse width modulation signal is detected by the rising-edge detecting unit, and the duty-cycle calculating unit calculates the duty cycle of the pulse width modulation signal. After that, the rising-edge detecting unit again resets the first counter and the second counter.

Similarly, at the timing T4, the duty cycle of the pulse width modulation signal varies (for example, the duty cycle of the pulse width modulation signal decreases from 99.9998% to 96.9998%), and the rising-edge detecting unit also resets the first counter and the second counter after the duty-cycle calculating unit calculates and obtains the duty cycle of the pulse width modulation signal. After that, the rising-edge detecting unit continues to detect a rising edge of the sampled pulse width modulation signal.

At the timing T5, the rising edge of the sampled pulse width modulation signal is detected by the rising-edge detecting unit, and the duty-cycle calculating unit calculates the duty cycle of the pulse width modulation signal between the timing T4 and the timing T5 according to the first counting value and the second counting value. After that, the rising-edge detecting unit resets that first counter and the second counter.

The rising-edge detecting unit can reset the first counter and the second counter at a proper timing, such that the counter module only stores counting values obtained from the timing when one rising edge of the sampled pulse width modulation signal is detected from the timing when the next rising edge of the sampled pulse width modulation signal is detected (that is, the present sampling period). In other words, the counter module will not store the counting values obtained in the previous sampling period. As a result, the duty cycle calculated and obtained by the duty-cycle calculating unit can be the same as the actual duty cycle of the pulse width modulation signal.

In addition, in the embodiment shown in FIG. 1, the LED dimming device has no rising-edge detecting unit, so the sampling unit may not be able to sample the pulse width modulation signal of which the duty cycle is larger than 96.9998%, such that the sampling unit is unable to detect the pulse width modulation signal at low level at the timing T2 or the timing T3. As a result, the LED module will flicker. However, in this embodiment, a rising edge of the pulse width modulation signal can be detected by the rising-edge detecting unit, and then the duty cycle of the pulse width modulation signal can be calculated, such that the sampling unit can always detect the duty cycle of the pulse width modulation signal even though the duty cycle of the pulse width modulation signal may vary.

Figure 3:
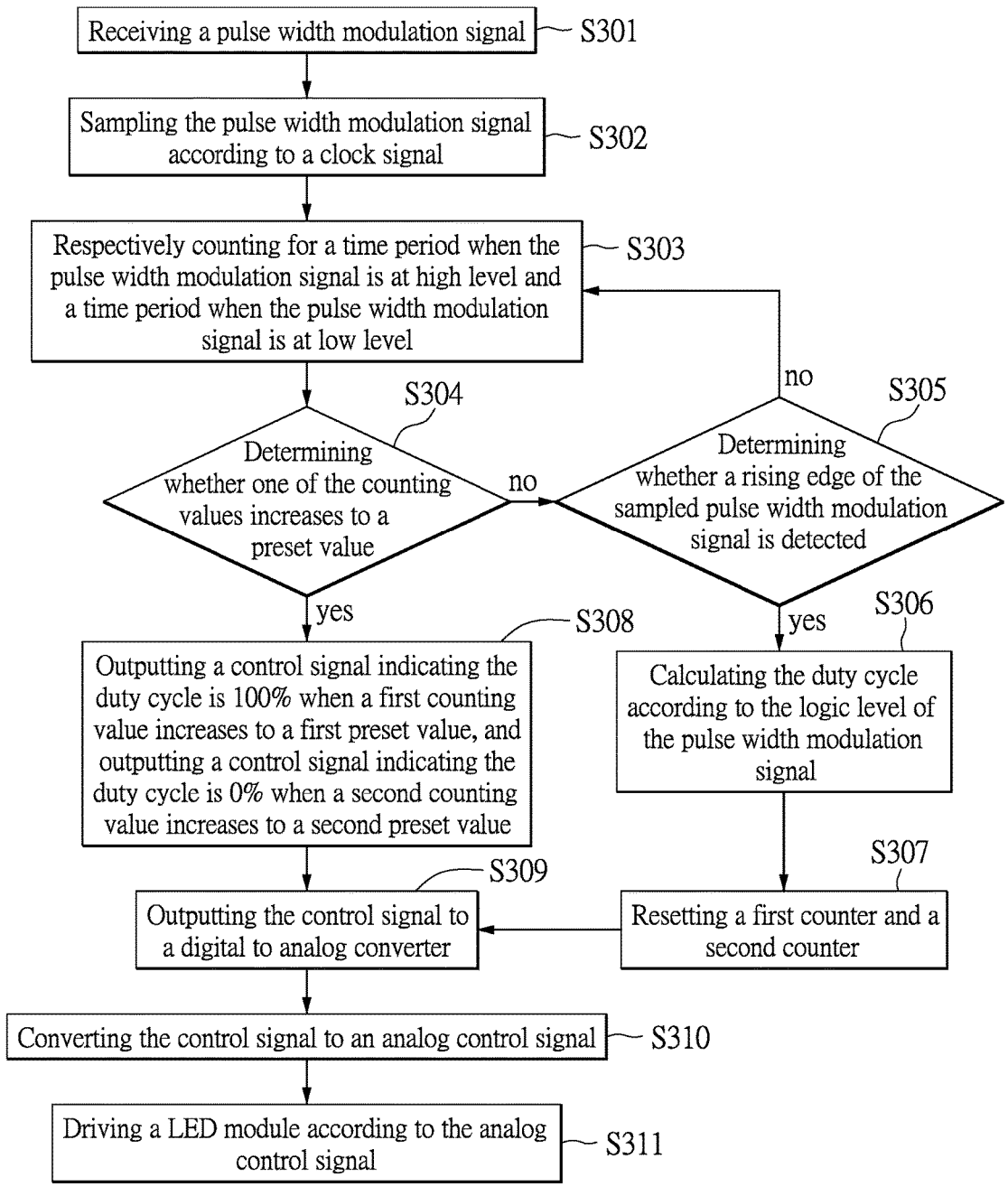
FIG. 3 shows a flow chart of an operation method for an LED dimming device of another embodiment of the instant disclosure.

In order to illustrate the operation of the LED dimming device, refer to FIG. 3. FIG. 3 shows a flow chart of an operation method for an LED dimming device of another embodiment of the instant disclosure. In step S301, the sampling unit receives a pulse width modulation signal. In step S302, the sampling unit samples the pulse width modulation signal according to the clock signal provided by the clock unit.

In step S303, the counter module receives sampling results generated by the sampling unit, and respectively counts for a timing period when the pulse width modulation signal is at high level and a timing period when the pulse width modulation signal is at low level. If the sampled pulse width modulation signal is at high level, the first counter increases the first counting value. On the contrary, if the sampled pulse width modulation signal is at low level, the second counter increases the second counting value.

In step S304, the duty-cycle calculating unit receives the first counting value and the second counting value provided by the counter module, and determines whether any one of the first counting value and the second counting value increases to a corresponding preset value. If the first counting value has not yet increased to a first preset value and the second counting value has not yet increased to a second preset value, and it goes to step S305. On the contrary, if the first counting value is equal to or larger than the first preset value, or if the second counting value is equal to or larger than the second preset value, and it goes to step S308.

In step S305, the rising-edge detecting unit determines whether a rising edge of the sampled pulse width modulation signal is detected. If the rising edge of the sampled pulse width modulation signal has not yet been detected, it returns to step S303. In step S303, the counter module increases the first counting value or increases the second counting value according to the logic level of the sampled pulse width modulation signal, and the rising-edge detecting unit continues to detect the rising edge of the sampled pulse width modulation signal. If the rising edge of the sampled pulse width modulation signal is detected by the rising-edge detecting unit, and it goes to step S306.

In step S306, the duty-cycle calculating unit receives the first counting value and the second counting value provided by the counter module, and calculates the duty cycle of the pulse width modulation signal according to the first counting value and the second counting value. Specifically, the duty-cycle calculating unit calculates and obtains the duty cycle of the pulse width modulation signal by dividing the first counting value by the sum of the first counting value and the second counting value, and then outputs a control signal according to the duty cycle.

In step S307, if the rising-edge detecting unit determines that the duty-cycle calculating unit has obtained the duty cycle of the pulse width modulation signal (for example, the rising-edge detecting unit has detected the control signal outputted by the duty-cycle calculating unit), and the rising-edge detecting unit outputs a reset signal to reset the first counter and the second counter.

In step S308, when the first counting value stored in the first counter increases to the first preset value, the duty-cycle calculating unit outputs a control signal indicating that the duty cycle is 100%. On the other hand, when the second counting value stored in the second counter increases to the second preset value, the duty-cycle calculating unit outputs a control signal indicating that the duty cycle is 0%.

It should be noted that, the first preset value and the second preset value are not limited in this embodiment, and those skilled in the art can set the first preset value and the second preset value depending on need for adjusting the duty cycle of the pulse width modulation signal.

In step S309, the duty-cycle calculating unit outputs a control signal to the digital to analog converter. In step S310, the digital to analog converter receives the control signal and converts the control signal to an analog control signal. In step S311, the current controller receives the analog control signal, and provides a current to drive the LED module according to the analog control signal.

To sum up, the operation method for an LED dimming device provided by the instant disclosure can dynamically adjust the luminance of a LED according to the variation of the duty cycle of the pulse width modulation signal. Moreover, the operation method for an LED dimming device provided by the instant disclosure can reset the counting values stored in the counter module at a proper timing to prevent the problem that the LED module may flicker because the actual duty cycle differs from the calculated duty cycle.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. An operation method for an LED dimming device, comprising:
    step A: sampling a pulse width modulation signal, and respectively counting a time period when the pulse width modulation signal is at high level and a time period when the pulse width modulation signal is at low level, wherein a first counter of a counter module increases a first counting value when the pulse width modulation signal is at high level and a second counter of the counter module increases a second counting value when the pulse width modulation signal is at low level;
    step B: determining whether a rising edge of the pulse width modulation signal is detected;
    step C: calculating a duty cycle of the pulse width modulation signal according to the first counting value and the second counting value stored in the counter module when the rising edge of the pulse width modulation signal is detected;
    step D: after calculating the duty cycle, resetting the first counting value and the second counting value of the counter module; and
    step E: driving an LED module according to the duty cycle;
    wherein in the step C, a duty-cycle calculating unit calculates and obtains the duty cycle by dividing the first counting value by the sum of the first counting value and the second counting value, when the first counting value stored in the first counter is less than the first preset value and the second counting value stored in the second counter is less than the second preset value.

2. The operation method for the LED dimming device according to claim 1, wherein in the step A, a sampling unit of the LED dimming device receives a clock signal and samples the pulse width modulation signal according to the clock signal.

3. The operation method for the LED dimming device according to claim 1, wherein in the step B, when the rising edge of the pulse width modulation signal is not detected by a rising-edge detecting unit of the LED dimming device, the counter module increases the first counting value or the second counting value according to the logic level of the sampled pulse width modulation signal, and the rising-edge detecting unit continues to detect the rising edge of the sampled pulse width modulation signal.

4. The operation method for the LED dimming device according to claim 1, wherein in the step C, the duty-cycle calculating unit of the LED dimming device outputs a control signal indicating that the duty cycle is 100% when the first counting value stored in the first counter increases to a first preset value.

5. The operation method for the LED dimming device according to claim 1, wherein in the step C, a duty-cycle calculating unit of the LED dimming device outputs a control signal indicating that the duty cycle is 0% when the second counting value stored in the second counter increases to a second preset value.

6. The operation method for the LED dimming device according to claim 1, wherein the step E further comprises:
    step E-1: receiving a control signal indicating the duty cycle of the pulse width modulation signal and converting the control signal to an analog control signal by a digital to analog converter of the LED dimming device; and
    step E-2: providing a current to drive the LED module according to the analog control signal by a current controller of the LED dimming device.

* * * * *